Jan. 23, 1923. 1,443,291
J. G. SWAIN.
WHEEL AND DEMOUNTABLE RIM.
FILED JAN. 15, 1919.
2 SHEETS-SHEET 1
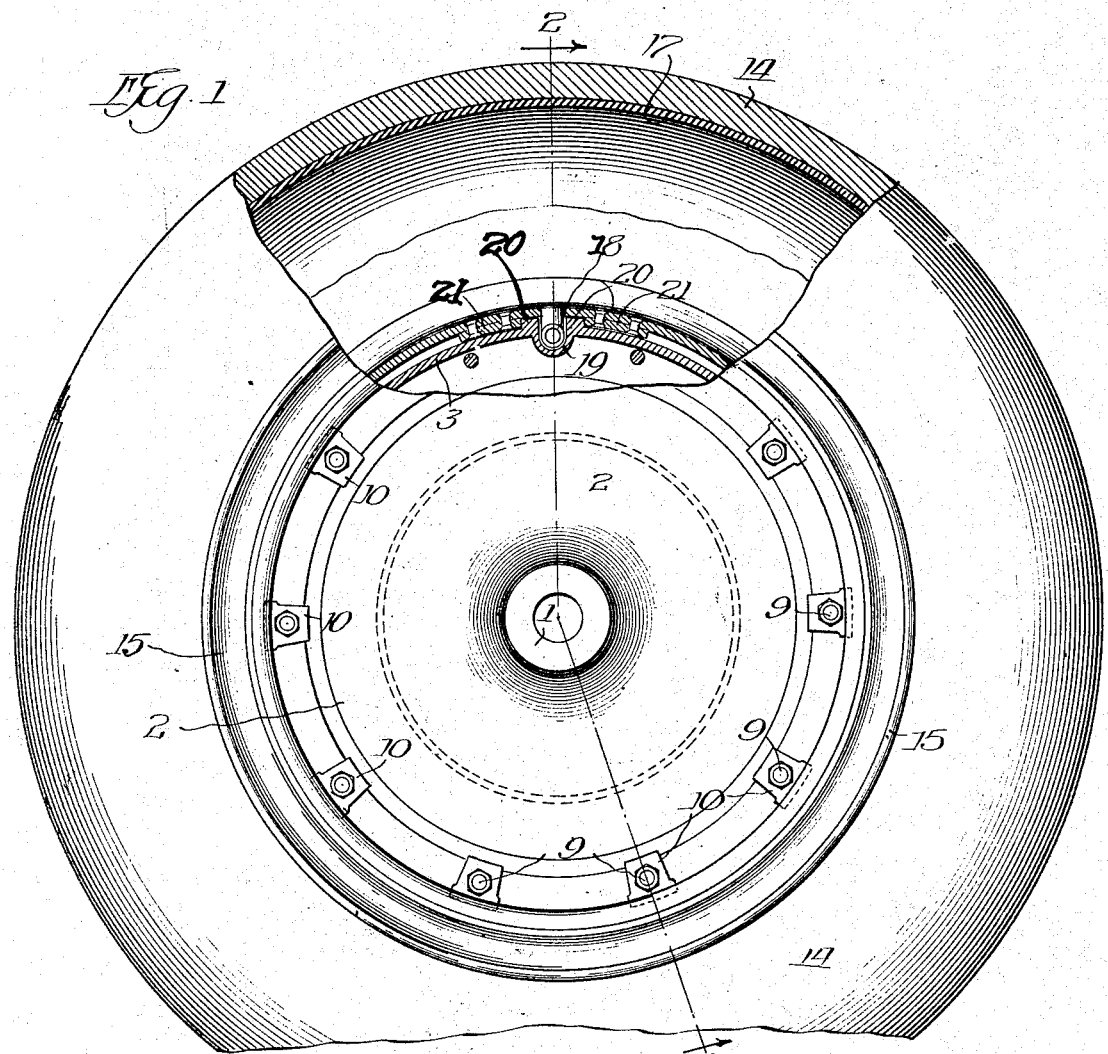
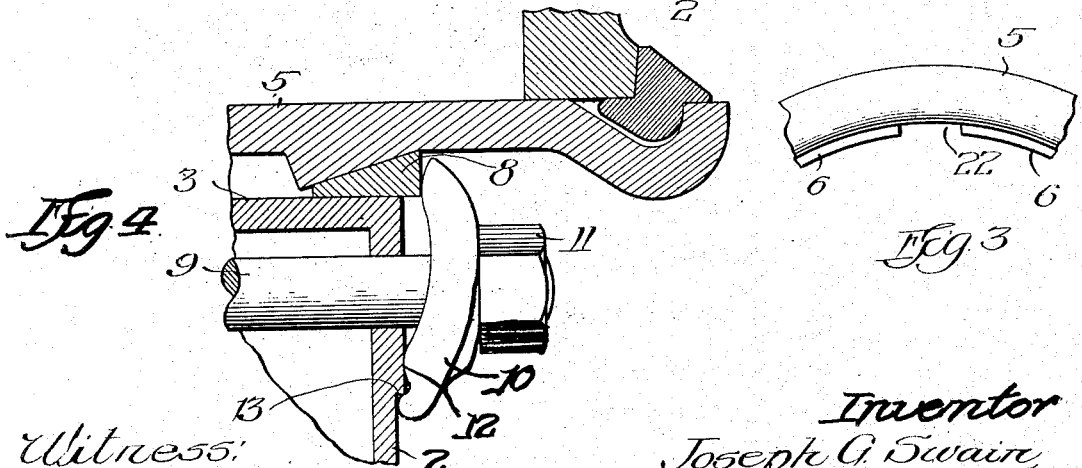
Witness:
Inventor
Joseph G. Swain,

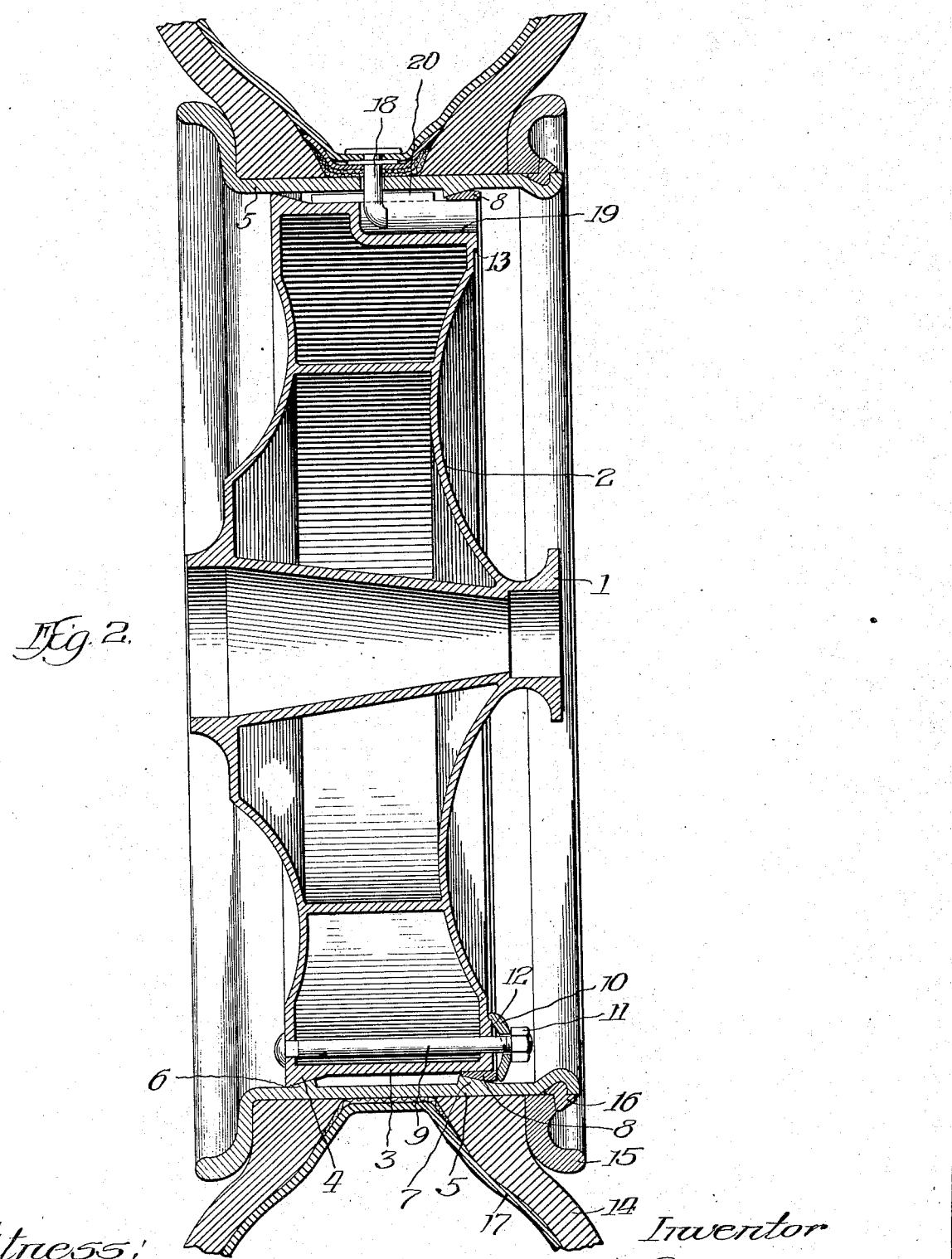

Patented Jan. 23, 1923.

1,443,291

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL AND DEMOUNTABLE RIM.

Application filed January 15, 1919.  Serial No. 271,296.

*To all whom it may concern:*

Be it known that I, JOSEPH G. SWAIN, a citizen of the United States, residing at Akron, in the county of Summit and State of Ohio, have invented certain new and useful Improvements in Wheels and Demountable Rims, of which the following is a specification.

In prior demountable rim constructions which have gone into extensive use it has been the practice to so mount the rim in relation to the felly of the wheel and arrange the valve stem that it has been necessary to "rock" the rim on to or off the wheel. By this expression is meant that the rim has to be tipped relatively to the plane of the wheel, whereupon the valve stem is dropped into the hole provided for it through the body or felly of the wheel. The rim is then swung into place on a plane coinciding with the plane of the wheel. In order to permit this action between the wheel and the rim, it is necessary to provide a certain amount of clearance between the outer periphery of the wheel and the inner periphery of the rim. In the construction of rims designed to carry tires of large cross section, it is not practical to provide for "rocking" the rim on to or off the wheel as a larger clearance space between the two parts is necessary than is consistent with safety. To obviate this difficulty, I have designed a form of wheel and demountable rim construction which will permit the rim to be withdrawn laterally from the wheel, the valve stem and wheel being so constructed as to permit such a withdrawal.

Another object of the invention is to provide a surface on the side of the wheel which will coact with the clamping plates which secure the rim to the wheel, so that they are prevented from turning on the bolt as the nuts are tightened. A further object of the invention is to improve the driving mechanism or the devices which prevent the rim from turning with respect to the wheel.

Other objects and advantages will appear as the description proceeds, it being understood that details of the invention may be changed without sacrificing its benefits in any way.

In the drawings:

Fig. 1 is a side elevation of the wheel and rim, a portion of the tire and rim being broken away to show the arrangement of the valve stem and driving devices.

Fig. 2 is a section on the line 2—2 of Fig. 1.

Fig. 3 is a detail of the side of the rim.

Fig. 4 is an enlarged cross section through the clamping plate.

The wheel which is comprised in this invention may be constructed from any suitable material and the body thereof may be constructed in any preferred way. I prefer, however, to use a cast steel wheel, which is designed for heavy duty and comprises a hub 1 and a body portion 2. The periphery 3 of the wheel is formed on a cylinder, the surface being parallel to the axis of the wheel, except for an inclined surface 4 at the back of the wheel which is designed to form a seat for the rear side of the rim.

The rim is shown at 5 and while it is preferably formed with two centrally arranged bevel ribs 6 and 7 on its inner surface, this design of rim base is non-essential and may be varied within the present well known practice. The beveled rib or bead 6 at the rear of the wheel is formed to seat firmly on the inclined surface 4 of the wheel. The outer rib or bead 7 is so located as to be directly over the outer edge of the wheel periphery, and between the wheel and the rib is arranged to be received a split locking ring 8, the under surface of which is cylindrical and adapted to rest on the wheel, the upper surface being frusto-conical and of the same bevel as the under side of the bead 7.

Near the outer periphery of the wheel are secured a series of transverse bolts 9 of any suitable number, the outer ends of which are arranged to receive slotted keepers or clamping plates 10 and nuts 11, which bear against the plates and force the clamping ring into position. The upper or outer ends of the several clamping plates bear against the clamping ring, while the lower ends bear against and fulcrum on the wheel. The clamp plates are arched as shown in Fig. 4 so that there will be no tendency to bend the bolt owing to the line contact which is maintained between the rear face of nut 11 and the face of the clamping plate 10.

In order to prevent the clamping plate from turning as the nut is tightened on the bolt, the lower inside edge is provided with a shoulder or recess 12 which seats upon an angular rib or rabbeted surface 13 around the face of the wheel. This forms a simple and convenient means for preventing rotation of the clamp plate on the bolt.

The rim may be of any preferred type, that shown being designed to carry a straight-side tire 14, and having a removable side flange 15 and locking ring 16. The inner tube is shown at 17. The valve stem is designated by the numeral 18 and extends a short distance below the rim, being bent outwardly at its lower end. This valve stem may be arranged with any suitable type of valve mechanism, and to its outer end may be applied any form of horizontal extension tube which may be provided with valve mechanism and adapted to be attached to the inflating pump. In order to receive the outer end of the valve stem 18 and any lateral extension which may be provided for it, the face of the wheel is formed with a gutter or channel opening from the face of the wheel and extending to a point beyond the location of the valve stem.

At the sides of the valve receiving gutter, the periphery of the wheel is formed with two lugs or projections 20, and to the under side of the rim are riveted two plates 21 at the sides of the lugs, the lugs and plates serving to prevent rotation of the rim on the wheel. The lugs and plates may be formed in any satisfactory manner but the particular arrangement shown is convenient and economical. In order to allow the rim to be removed laterally, a section of the inner bevel rib is removed, forming a gap 22 which will pass over the driving lugs 20.

Many of the details shown and described may be varied within the scope of the invention and I consider myself entitled to such as fairly come within the purview of the appended claims.

I claim:

1. A wheel structure comprising a wheel body, a substantially cylindrical outer surface on said wheel body, a rim seat at one side of the wheel body, a demountable rim on said wheel, seating surfaces on the under side of said rim, the surface on the rear of said rim resting on said rim seat, the surface of said wheel having a recess to receive the valve stem, a driving lug on the surface of the wheel at one side of the recess, the said surface on the rear of the rim being apertured to pass over the said driving lug, and a formation on the under side of the rim to cooperate with the driving lug.

2. A wheel structure comprising a wheel body, a substantially cylindrical outer surface on said wheel body, an outwardly extending beveled rim seat on the inner edge of the wheel body, a demountable rim on said wheel, beveled ribs on the under side of the rim, the rib on the rear side of the rim being seated on the said rim seat, the surface of the wheel having a depression to receive the valve stem, a driving lug on the surface of the wheel at the side of the depression, the rear beveled rib being cut away adjacent the valve stem opening to pass over the said lug.

J. G. SWAIN.